June 27, 1967    G. B. KECK    3,328,736
BOBBIN AND TERMINAL STRUCTURES FOR ELECTRICAL COILS
Filed March 12, 1965

INVENTOR
G. B. KECK
BY A. C. Schway, Jr.
ATTORNEY

# United States Patent Office 3,328,736
Patented June 27, 1967

3,328,736
BOBBIN AND TERMINAL STRUCTURES FOR ELECTRICAL COILS
George B. Keck, Western Springs, Ill., assignor to Western Electric Company, Incorporated, New York, N.Y., a corporation of New York
Filed Mar. 12, 1965, Ser. No. 439,305
5 Claims. (Cl. 336—192)

This invention relates to coil supporting structures, and more particularly to bobbin and terminal structures on which coils may be readily wound and terminated.

In the manufacture of coil supporting structures having molded bobbins with cylindrical hubs, difficulty has been experienced in preventing the rotary displacement of the coils on the bobbins, in protecting the lead portions of the coils from the abraiding effect of the coil wires as successive layers of the wires are wound onto the bobbins, and in the attachment of terminals onto the bobbins in positions facilitating the connection of the coil windings and other circuitry thereto.

An object of the present invention is to provide a bobbin having a hub of substantially cylindrical shape for supporting a coil thereon and for preventing the rotary displacement of the coil on the hub.

Another object of the invention is to provide a molded bobbin having a hub on which a plurality of coil windings may be wound in superposed concentric relation one to the other, and having one of the heads extending from the hub formed to receive and protect the lead-in and lead-out wires of the coil windings during the winding operation.

A further object of the invention is to provide an improved bobbin and terminal structure in which the terminals may be readily attached to the bobbin and supported thereby in postions readily accessible for the connection of one or more coil windings and other circuitry thereto.

A coil structure, illustrating certain aspects of the invention, may include a molded bobbin having a pair of heads and a cylindrical hub extending therebetween, on which hub one or more coil windings may be wound with the windings in concentrically superposed relation one to another, and which hub has a pair of diametrically opposed ribs extending longitudinally on the outer periphery thereof for preventing rotary displacement of the windings on the hub.

To prevent injury to the lead-in and lead-out portions of the wires of single or multiple windings during the winding of the coil onto the bobbin, one of the heads is provided with a pair of grooves formed on the inner side thereof adjacent to the coil and extending to the opposite edges of the head. One of the grooves is positioned substantially tangent to the hub for receiving and protecting the lead-in wire of a single winding or the lead-in wire of the primary of a multiple winding, and the second groove is spaced from and on the opposite side of the hub for receiving and protecting the lead-out wire of a single winding or the lead-out wire of the primary winding and the lead-in wire of a secondary winding.

Such bobbin head has an octagonal peripheral configuration and has four bosses formed on the outer side thereof opposite to the coil, each of which bosses is recessed to receive and to have pressed thereinto the intermediate portion of an L-shaped terminal and to support the terminal with one leg thereof extending from the head parallel to the axis of the hub and with the end accessible for external circuitry connections, and with the other leg of the terminal extending substantially parallel to the head and with the end portion thereof projecting beyond the edge of the head for termination of a winding lead thereto.

Other objects, advantages and novel aspects of the invention will become apparent upon consideration of the following detailed description, in conjunction with the accompanying drawing, in which.

Figure 1:
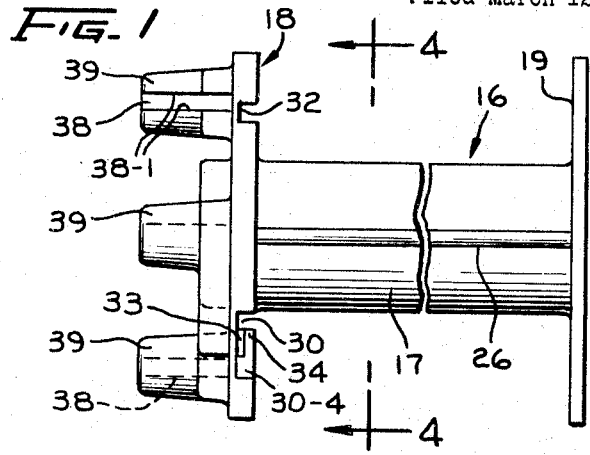
FIG. 1 is a side elevational view of a molded bobbin.
Figure 3:
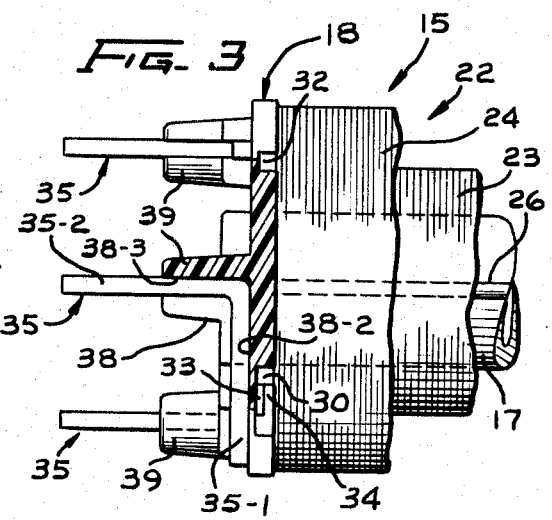
FIG. 3 is a fragmentary elevational sectional view of the bobbin taken along the line 3—3 of FIG. 2 and showing the L-shaped terminals in position thereon and a portion of the two windings thereon.

Referring to the drawings, the coil assembly 15 shown fragmentarily in FIG. 3 includes a molded bobbin 16 (FIG. 1) having a cylindrical hub 17 and a pair of heads 18 and 19 extending transversely from opposite ends thereof. The hub 17 of the bobbin is hollow for the reception of an iron core therein and is adapted to have a coil 22 wound thereon which may be a single winding or which may include primary and secondary windings 23 and 24 arranged in concentric and superposed relation of one to the other as shown in FIG. 3.

The cylindrical hub 17 is provided with a pair of diametrically opposed, longitudinally extending ribs 26. The ribs 26 project laterally from the cylindrical periphery of the hub 17 and cause the winding 23 to be wound thereon in a conforming non-circular configuration and form an interlocking connection with the hub 17 which serves to fixedly support the coil on the bobbin and prevent rotary movement thereof relative to the bobbin. Although the hub 17 has been shown as having a pair of ribs 26, it will be understood that the hub may be provided with one, two or more longitudinally directed ribs 26 to effect a non-rotary interconnection between the hub and the coil wound thereon. In addition, it will be understood that when two windings are wound onto the hub, the primary winding engages the hub 17 and the ribs 26 thereon and is held thereby against rotary movement relative thereto and that the secondary is likewise held against rotary movement relative to the primary, in part by a slight noncircularity of cross-sectional contour and in part by the frictional engagement between the primary and secondary windings.

Figure 2:
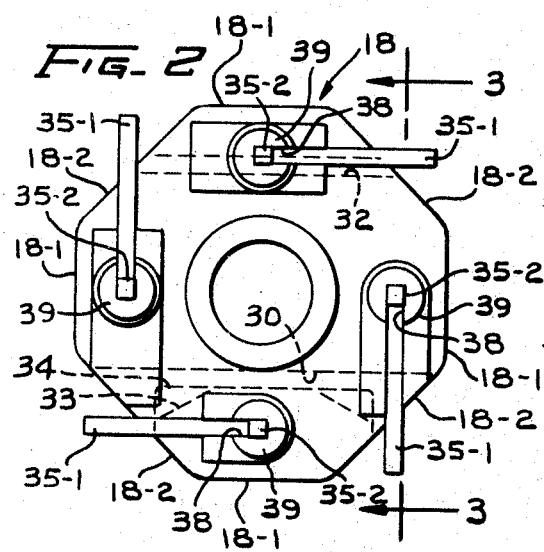
FIG. 2 is an end view of the molded bobbin showing L-shaped terminals in position thereon.
Figure 4:
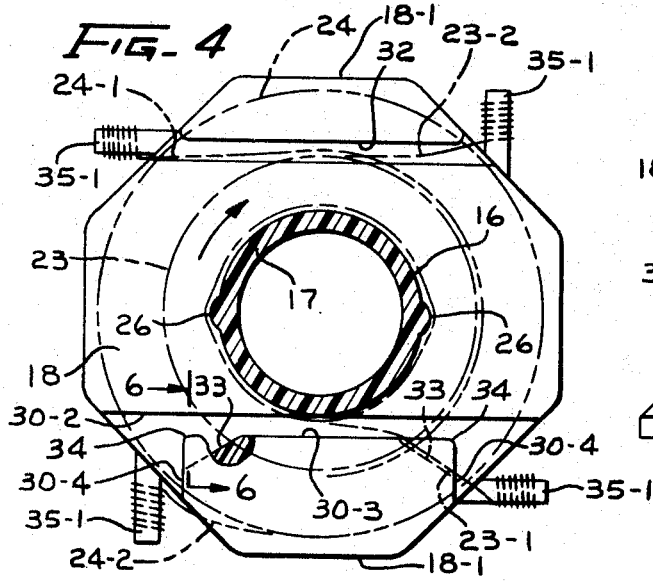
FIG. 4 is a transverse sectional view through the bobbin taken on line 4—4 of FIG. 1 and showing a portion of the windings and the terminals in broken lines.

As viewed from one end of the bobbin, the head 18 has an octagonal peripheral edge (FIGS. 2 and 4). On its inner face directed toward the coil 22, the head 18 has a pair of straight grooves 30 and 32 formed therein for receiving and protecting the leads of the windings 23 and 24 during the winding of the coil onto the bobbin. The grooves 30 and 32 are disposed on opposite sides of the hub 17 in parallel relation to each other and to one pair of four alternate edges 18–1 of the head 18 and extend across the entire face of the head to the edges 18–2 which are disposed obliquely to the edges 18–1.

One of the grooves (30) is positioned tangential to the hub 17 for receiving the lead-in wire 23–1 of the winding 23, as indicated diagrammatically in broken lines in FIG. 4, and for protecting such lead-in wire against the rubbing action of the coil wire during the winding of successive layers of the coil 22. The other groove 32 is positioned in spaced relation to the hub 17 for receiving and protecting the lead-out wire 23–2 of the winding 23 and for receiving and protecting the lead-in wire 24–1 of the winding 24 during the winding of successive layers of the winding 24.

Figure 6:
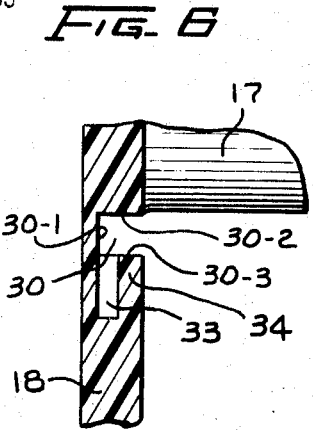
FIG. 6 is an enlarged fragmentary sectional view of the bobbin taken on line 6—6 of FIG. 4.

The groove 30 is defined by a first or bottom wall surface 30–1 (FIG. 6) which is disposed in spaced and parallel relation to the inner face of the head, and by a pair of second or side wall surfaces 20–2 and 30–3 which extend transversely of and between the first wall surface 30–1 and the inner face of the head and extend to the peripheral edges of the head. The intermediate portion of the wall surface 30–3 is parallel to the wall surface 30–2 and at the outer ends thereof the end portions 30–4 (FIG. 4) of the wall surfaces 30–3 are directed transversely of the intermediate portion to the peripheral edge of the head to form elongated end portions of the groove 30 adjacent to the periphery of the head for the passage of the wire therethrough.

The head 18, at the junctures of the wall surfaces 30–3 and 30–4, is provided with a pair of notches 33 which form portions of the groove 30 and provide a pair of ledges 34. These ledges 34 are disposed flush with the inner face of the head and in spaced relation to the first wall surface 30–1, are spaced from the peripheral edge of the head and from the hub, and serve to retain a wire in the groove 30.

It will be understood that the composite groove 30 has two portions thereof which extend in opposite directions from the hub 17 to the periphery of the head, one of which portions may be used for receiving the coil lead 23–1 when the coil 23 is wound left-handed, and the other portion of which may be used for receiving the coil lead 23–1 when the coil is wound right-handed.

Figure 5:
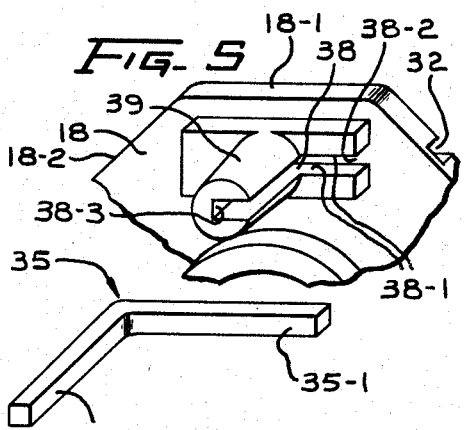
FIG. 5 is a fragmentary view in perspective showing a terminal and a portion of the bobbin in separated relation to one another.

The lead-in wires 23–1 and 24–1 and the lead-out wires 23–2 and 24–2, as indicated in broken lines in FIG. 4, are wrapped or otherwise connected to legs 35–1 of L-shaped terminals 35 (FIGS. 3 and 5) secured to the head 18. Each terminal 35 is made of square wire and has a pair of legs 35–1 and 35–2 bent at right angles to each other.

Four of such terminals 35 are pressed into recesses 38 of four terminal-receiving bosses 39 formed on the outer side of the head 18. The recesses 38 are, in effect, L-shaped grooves, with two straight portions disposed at right angles to each other for receiving adjacent portions of the legs of the terminals. The grooves are defined by a pair of parallel wall surfaces 38–1 spaced apart a distance slightly less than the width of the terminal 35 for receiving and gripping an intermediate portion of the terminal pressed therebetween. The straight portions of the grooves or recesses 38 are also defined by surfaces 38–2 and 38–3 (FIG. 3) which are disposed respectively parallel to and transversely of the head 18 and cooperate with the surfaces 38–1 to engage portions of a third side of each of the legs 35–1 and 35–2, respectively, and to support the terminals with the legs 35–2 extending from the head in parallel relation to the axis of the core 17 and with the legs 35–1 disposed parallel to the head 18 and to one edge 18–1 thereof. The end portions of the legs 35–1 project beyond the obliquely disposed peripheral edges 18–2, as mentioned above, in a position readily accessible for the attachment of a coil lead thereto.

From an inspection of FIG. 2, it will be seen that the bosses 39 and the terminals 35 therein are disposed adjacent the side edges 18–1 of the octagonal head 18 and with the end portion of each of the legs 35–1 extending beyond the obliquely disposed edge portions 18–2 of the head 18 and within the area of the projected two adjacent side edges 18–1 of the head. With this arrangement of the terminals and bobbin heads, a plurality of the coil structures 15 may be placed in side-by-side relation to each other with the side edges 18–1 of the heads 18 in engagement with one another in which condition the terminals 35 of the adjacent coil structures are disposed in spaced relation to one another.

Although the present coil supporting structure is disclosed herein as having two coil windings and four terminals for the termination of the windings thereto, it will be understood that the bobbin may be used for supporting a single coil winding and have only two terminals for the termination of the winding thereto.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A coil support comprising:
   a bobbin having a hub for supporting a pair of coil windings; and
   a pair of heads extending transversely from said hub in axially spaced relation to one another, one of said heads having a pair of grooves formed therein on the inner side thereof facing the coil supporting portion of said hub and extending across said head to opposite edges thereof, one of said grooves being disposed tangent to said hub for receiving the lead-in portion of the wire of a first coil winding which may be wound on said hub, and said second groove being disposed in spaced relation to said hub for receiving the lead-out portion of the wire of such first winding and the lead-in portion of the wire of a second winding which may be wound on said hub.

2. A one-piece molded bobbin having a hub capable of supporting a pair of coil windings and having a head extending transversely from said hub, said head having a pair of grooves formed therein on one side thereof facing the coil supporting portions of said hub and extending across said head to opposite edges thereof, one of said grooves being disposed on one side of and tangent to said hub for receiving the lead-in portion of the wire of a first winding which may be wound on said hub, and the other groove being disposed in spaced relation to and on the opposite side of said hub from said one groove for receiving the lead-out portion of the wire of such first winding and the lead-in portion of the wire of a second winding which may be wound on the bobbin.

3. A coil supporting structure comprising:
   a bobbin having a hub for supporting a coil thereon and having a head extending transversely of said hub from one end thereof, said head on one side thereof remote from the coil supporting portion of said hub being shaped to form an L-shaped groove for receiving an intermediate portion of an L-shaped terminal therein; and
   an L-shaped terminal of rectangular cross section having a pair of legs disposed at right angles to one another and with adjacent portions of both legs seated in said L-shaped groove;
   said L-shaped groove having a first straight portion disposed parallel to the axis of said hub for supporting one leg of said terminal parallel to said axis and with the end portion of the terminal extending beyond said groove and from said one side of said head, and having a second straight portion disposed transversely of said axis for supporting the other leg of said terminal transversely of said axis and with the end portion of said leg extending beyond said groove and the edge of said head;
   said groove portions, respectively, being U-shaped in cross section and having a pair of opposed parallel surfaces engaging opposite sides of a leg of said terminal for gripping the terminal therebetween, and having a third surface extending transversely between said first surfaces in engagement with a third side of a leg of said terminal.

4. A coil supporting structure comprising:
   a bobbin having a hub for supporting a pair of concentric coil windings;
   a pair of heads extending transversely from said hub, one of said heads having a pair of grooves formed thereon on one side thereof facing the coil windings and on opposite sides of said hub and extending across said head to opposite edges thereof, one of said grooves being positioned tangent to said hub for receiving the lead-in portion of the wire of the first winding on said hub, and the other groove being disposed in spaced relation to said hub for receiving the lead-out portion of the wire of the first winding and the lead-in portion of the wire of the second winding;

bosses formed on the other side of said head and each provided with a recess for receiving an L-shaped terminal therein;

a terminal of rectangular cross-section seated in each of said recesses and having a pair of legs disposed at right angles to one another;

each of said recesses being bounded by a pair of opposed parallel first wall surfaces of said boss disposed parallel to the axis of said hub for gripping portions of opposite sides of both of said legs of said terminal therebetween and by second and third wall surfaces of said boss extending transversely between said first wall surfaces and disposed in parallel and transverse relation, respectively, to said axis and engaging portions of a third side of both of said legs for supporting said terminal with one leg thereof directed from said head in parallel relation to said axis and with said other leg disposed parallel to said head and with the end portion of said other leg projecting beyond the edge of said head and ajacent to the end of one of said grooves to facilitate the termination of the windings thereto.

5. A coil supporting structure comprising:

a bobbin having a cylindrical hub for supporting a pair of concentric coil windings;

a longitudinally directed rib on the outer surface of said hub for locking said coil windings thereon against rotation relative thereto;

a pair of heads extending transversely from said hub, one of said heads having a pair of grooves formed thereon on one side thereof facing the coil windings and on opposite sides of said hub and extending across said head to opposite edges thereof, one of said grooves being positioned tangent to said hub for receiving the lead-in portion of the wire of the first winding on said hub, and the other groove being disposed in spaced relation to said hub for receiving the lead-out portion of the wire of the first winding and the lead-in portion of the wire of the second winding;

four bosses formed on the other side of said head and each provided with a recess for receiving an L-shaped terminal therein;

a terminal of rectangular cross-section seated in each of said recesses and having a pair of legs disposed at right angles to one another;

each of said recesses being bounded by a pair of opposed parallel first wall surfaces of said boss disposed parallel to the axis of said hub for gripping portions of opposite sides of both of said legs of said terminal therebetween and by second and third wall surfaces of said boss extending transversely between said first wall surfaces and disposed in parallel and transverse relation, respectively, to said axis and engaging portions of a third side of both of said legs for supporting said terminal with one leg thereof directed from said head in parallel relation to said axis and with said other leg disposed parallel to said head and with the end portion of said other leg projecting beyond the edge of said head and adjacent to the end of one of said grooves to facilitate the termination of the windings thereto.

References Cited

UNITED STATES PATENTS

| | | | |
|---|---|---|---|
| 450,218 | 4/1891 | Cheney | 242—118.4 |
| 1,435,475 | 11/1922 | Joyce | 242—118.3 |
| 1,456,108 | 5/1923 | Johannesen | 336—208 |
| 2,922,932 | 1/1960 | Glowacki et al. | 336—192 X |
| 3,014,164 | 12/1961 | Howenstine | 336—192 X |
| 3,076,165 | 1/1963 | Weyrich | 336—192 X |
| 3,117,294 | 1/1964 | Muszynski et al. | 336—198 X |
| 3,131,371 | 4/1964 | Brekke et al. | 336—192 |

LEWIS H. MYERS, *Primary Examiner.*

T. J. KOZMA, *Assistant Examiner.*